US010412147B2

(12) United States Patent
Zheng (10) Patent No.: US 10,412,147 B2
(45) Date of Patent: Sep. 10, 2019

(54) DATA PROCESSING SYSTEM, CENTER APPARATUS, AND PROGRAM (71) Applicants: Hyway Technology Shanghai Co., Ltd., Shanghai (CN); Sino-Japanese Engineering Corp., Tokyo (JP)

(72) Inventor: Zeyong Zheng, Tokyo (JP)

(73) Assignees: Hyway Technology Shanghai Co., Ltd., Shanghai (CN); Hyway Technology (Japan) Corp., Tokyo (JP)

( * ) Notice: Subject to any disclaimer, the term of this patent is extended or adjusted under 35 U.S.C. 154(b) by 200 days.

(21) Appl. No.: 14/905,176

(22) PCT Filed: Jul. 15, 2013

(86) PCT No.: PCT/CN2013/079388
§ 371 (c)(1),
(2) Date: Jan. 14, 2016

(87) PCT Pub. No.: WO2015/006903
PCT Pub. Date: Jan. 22, 2015

(65) Prior Publication Data
US 2016/0173561 A1    Jun. 16, 2016

(51) Int. Cl.
*H04L 29/08* (2006.01)
*H04L 29/06* (2006.01)
(52) U.S. Cl.
CPC ......... *H04L 67/02* (2013.01); *H04L 63/0236* (2013.01); *H04L 63/14* (2013.01);
(Continued)

(58) Field of Classification Search
CPC . H04L 67/02; H04L 67/2823; H04L 63/0236; H04L 63/14; H04L 63/1475; H04L 69/08
See application file for complete search history.

(56) References Cited

U.S. PATENT DOCUMENTS 6,732,112 B1  5/2004 Nagatomo et al.
2003/0204564 A1* 10/2003 Keene .................. G06F 17/50
709/203

(Continued)

FOREIGN PATENT DOCUMENTS

CN    101251860 A    8/2008
CN    101583072 A    11/2009
(Continued)

OTHER PUBLICATIONS

International Search Report for PCT/CN2013/079388, dated Apr. 3, 2014.
(Continued)

*Primary Examiner* — Azizul Choudhury (57) ABSTRACT

Provided is a data processing system capable of decreasing the possibility of attack to the server, regardless of the presence or absence of vulnerability of a web browser. In response to the data input at the terminal 3, the center apparatus 2 transmits, to the terminal 3, a data input program for transmitting the input data to the center apparatus 2. The center apparatus 2 receives data to be processed and the URL of the server 1 from the terminal 3, accesses the received URL, and transmits the data to be processed to the server 1 by the HTTP protocol.

3 Claims, 7 Drawing Sheets (52) U.S. Cl.
CPC ...... *H04L 63/1475* (2013.01); *H04L 67/2823* (2013.01); *H04L 69/08* (2013.01)

(56) References Cited

U.S. PATENT DOCUMENTS

| | | | |
|---|---|---|---|
| 2004/0030610 A1* | 2/2004 | Mimura | G06Q 10/087 705/305 |
| 2008/0229427 A1 | 9/2008 | Ramirez | |
| 2009/0150485 A1* | 6/2009 | Kawabata | H04L 63/0815 709/203 |
| 2012/0137210 A1* | 5/2012 | Dillon | G06F 17/30902 715/234 |
| 2013/0103946 A1* | 4/2013 | Binenstock | H04L 63/0492 713/168 |

FOREIGN PATENT DOCUMENTS

| | | |
|---|---|---|
| CN | 102916958 A | 2/2013 |
| JP | 2004-213066 A | 7/2004 |
| JP | 2006-174055 A | 6/2006 |
| JP | 2006-203690 A | 8/2006 |
| JP | 2011-034290 A | 2/2011 |
| WO | 98/006037 A1 | 2/1998 |

OTHER PUBLICATIONS

European Patent Office, Extended European Search Report for EP patent application No. 13889506.5, dated Dec. 12, 2016.
Japan Patent Office, Office Action for Japanese patent application No. 2016-526387, dated May 9, 2017.
Japan Patent Office, Office Action for Japanese patent application No. 2016-526387, dated Feb. 27, 2018.

* cited by examiner

TYPE
Type (a) Text Display (text tag)

| 1 | Mode | Size | Coordinate Value | Text | |
|---|---|---|---|---|---|
| | Mode | Size | x,y | Text | |

(b) Button Display (button tag)

| 2 | Mode | Size | Coordinate Value | Text | | Button Function | URL | |
|---|---|---|---|---|---|---|---|---|
| | Mode | Size | x,y | Text | | func | | |

(c) Input Field (input tag)

| 3 | Mode | Size | Coordinate Value | Input Mode | Display Mode | Display Position Designation |
|---|---|---|---|---|---|---|
| | Mode | Size | x,y | inputmode | dspmode | dspx,dspy |

| Barcode Input Availability | Maximum Character Number | Parameter | Minimum Value | | Maximum Value | |
|---|---|---|---|---|---|---|
| method | len | param | Min | | Max | |

| Default Display | | Good Time Display | | Bad Time Display | |
|---|---|---|---|---|---|
| Default | | Goodhint | | Badhint | |

(d) Display of Splash Screen (such as a screen display for a predetermine period of time) (splash tag)

| 4 | Display Duration | URL | |
|---|---|---|---|
| | Time | | |

(e) Selection Menu Display (select tag)

| 5 | Mode | Size | Start Point y-Coordinate | End Point y-Coordinate | Number of Items | Coordinate Value | Repeat Entry |
|---|---|---|---|---|---|---|---|
| | Mode | Size | Starty | Endy | Number | x,y | |

Entry:

| Key | URL | | Text | |
|---|---|---|---|---|
| Key | | | Text | |

(f) Hint Display (hint tag)

| 6 | Method | Duration | Delay | Count | Name | |
|---|---|---|---|---|---|---|
| | Method | Time | Delay | Count | Name | |

: End of Data (0xFE 0xDC)

[FIG.5]

```
<compare start=1 total=5>
<comparegroup>
<comparevalue>A,B,C,D,E</comparevalue>
<compareoption option=1></compareoption>
<compareoption option=2 subxml="2.xml"></compareoption>
<compareoption option=3 subxml="3.xml"></compareoption>
</comparegroup>
<comparegroup operation=2>
<comparevalue>10,20,30,40,50</comparevalue>
<compareoption option=3></compareoption>
<compareoption option=1 forward=1></compareoption>
<compareoption option=2 forward=2 subxml="2.xml"></compareoption>
</comparegroup>
</compare>

<text mode=1 size=1 x=1 y=1>input1</text>
<input mode=1 size=1 x=1 y=2 char=2 tip=1 method=2 property=2 len=10 param="chdata1"></input>
<text mode=1 size=1 x=1 y=3>input2</text>
<input mode=1 size=1 x=1 y=4 char=2 tip=1 method=1 len=10 param="chdata2"></input>

<subxml name="2.xml> ... </subxml>
<subxml name="3.xml> ... </subxml>
```

[FIG.6]

```
<compare start=1 total=5>
<comparegroup>
<comparevalue>A,B,C,D,E</comparevalue>
<compareoption option=1></compareoption>
<compareoption option=2 subxml="2.xml"></compareoption>
<compareoption option=3 subxml="3.xml"></compareoption>
</comparegroup>
<comparegroup operation=2>
<comparevalue>10,20,30,40,50</comparevalue>
<compareoption option=3></compareoption>
<compareoption option=1 forward=1></compareoption>
<compareoption option=2 forward=2 subxml="2.xml"></compareoption>
</comparegroup>
</compare>

<text mode=1 size=1 x=1 y=1>input1</text>
<input mode=1 size=1 x=1 y=2 char=2 tip=1 method=2 property=2
len=10 param="chdata1"></input>
<text mode=1 size=1 x=1 y=3>input2</text>
<input mode=1 size=1 x=1 y=4 char=2 tip=1 method=1 len=10
param="chdata2" default="1" submit=2></input>

<subxml name="2.xml> ... </subxml>
<subxml name="3.xml> ... </subxml>
```

[FIG.7]

DATA PROCESSING SYSTEM, CENTER APPARATUS, AND PROGRAM

TECHNICAL FIELD

The present disclosure relates to a data processing system, a center apparatus, and a program.

BACKGROUND ART

In recent years, many devices such as various home appliances, a typical example of which being a business-use handy terminal, are controlled by microcomputers. Further, as communication technologies such as Internet technologies advance, such a device is provided with a communication function to become capable of transmitting/receiving data through a network.

For example, a handy terminal may be provided with a function to perform a calculation process on the basis of a barcode read by a barcode reader, and in response to an instruction, to transmit a calculation result to a computer located at the center side.

Another typical example may be imode (registered trademark) in a mobile phone. In this example, a web browser or Java (registered trademark) Runtime Environment is installed in the mobile phone, and a center apparatus in a packet exchange network acquires a document described in HTML (Hyper Text Markup Language) from a server on the Internet, and delivers the acquired document as it is to the mobile phone. The mobile phone interprets HTML and displays the document on a screen.

Further, some of the devices may switch functions of a key provided on the device, using HTML (Patent Document 1). Also, in many Internet mail-order sites, data input by a user at the terminal side is received by the server side and verified, and as a result of the verification, if an error is found in data input and re-input is required, an HTML document for prompting the re-input is further delivered to the terminal side.

PRIOR ARTS

Patent Document

WO 98/006037

SUMMARY

However, when a document described in HTML is used at the terminal side, if an ordinary web browser is used, the URL of the server performing data processing at the center side or the access route thereto may be known by a malicious user, using a malware targeting the vulnerability of the web browser, and the like.

The present disclosure has been created taking the above drawbacks into account. One of the objectives of the present disclosure is to provide a data processing system, a center apparatus, and a program capable of reducing the possibility of attacks to a server, regardless of the presence/absence of the vulnerability of a web browser.

In order to solve the above drawbacks of the prior arts, provided is a data processing system comprising a server which receives an access to a predetermined URL and executes requested data processing, a terminal which requests data processing to the server, and a center apparatus which is connected to the server and the terminal, the center apparatus comprising a device which receives data input, and transmits a data input program for transmitting the input data to the center apparatus, to the terminal and a device which receives data to be processed and the URL of the server from the terminal, accesses the received URL, and transmits the data to be processed to the server by an HTTP protocol, and the terminal operating in accordance with the data input program transmitted from the center apparatus, receiving the input of data to be processed, and transmitting the received data and the URL of the server to the center apparatus.

An embodiment of the present disclosure is a center apparatus connected to a server which receives an access to a predetermined URL and executes requested data processing, and a terminal which requests data processing to the server, the center apparatus comprising a device which receives data input, and transmits a data input program for transmitting the input data to the center apparatus, to the terminal, and a device which receives data to be processed and the URL of the server from the terminal, accesses the received URL, and transmits the data to be processed to the server by an HTTP protocol.

Another embodiment of the present disclosure is a program which is executed at a center apparatus connected to a server which receives an access to a predetermined URL and executes requested data processing, and a terminal which requests data processing to the server, the program making the center apparatus function as a device which receives data input, and transmits a data input program for transmitting the input data to the center apparatus, to the terminal, and as a device which receives data to be processed and the URL of the server from the terminal, accesses the received URL, and transmits the data to be processed to the server by an HTTP protocol.

EMBODIMENT

[Basic Process]

Figure 1:
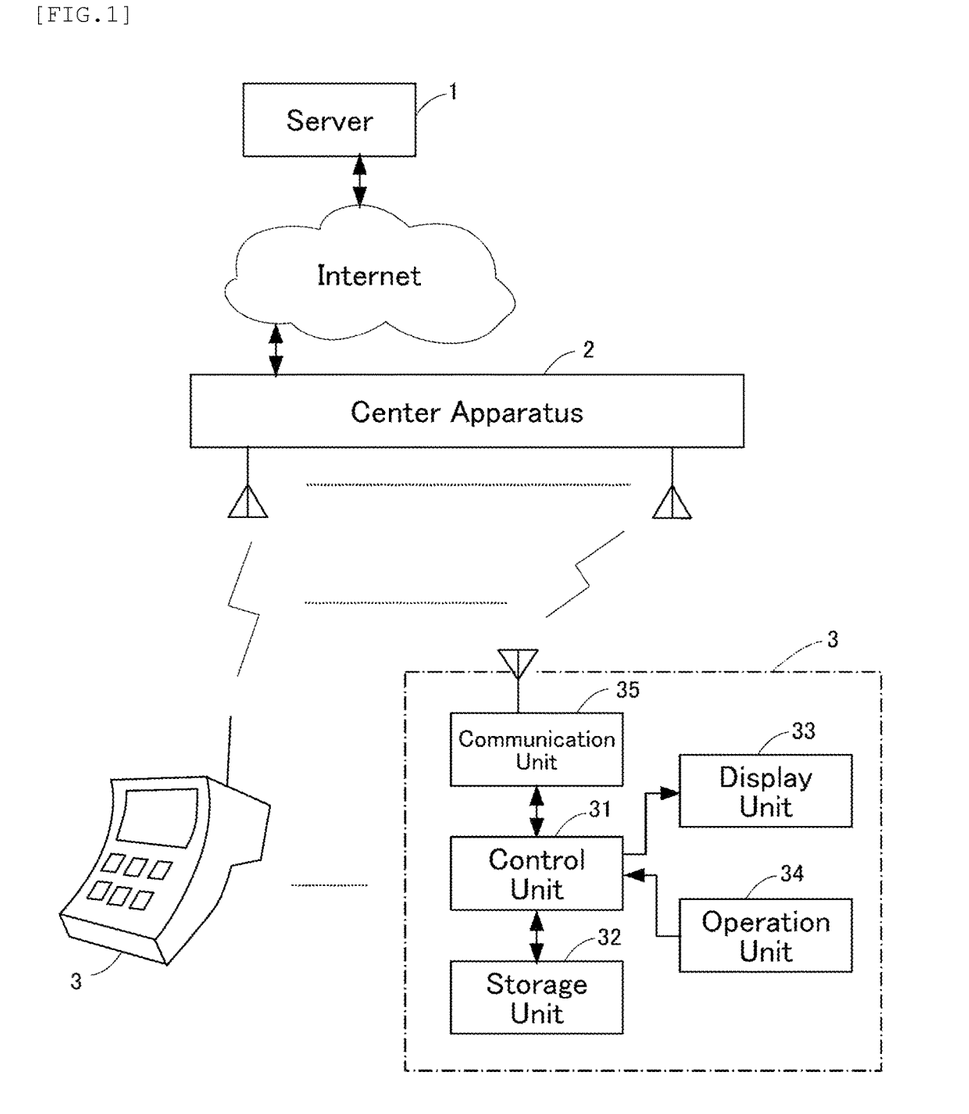
FIG. 1 is a structural block diagram showing an example of a data processing system according to an embodiment of the present disclosure.

An embodiment of the present disclosure will be explained with reference to the drawings. As shown in FIG. 1, a data processing system according to the present embodiment comprises a server 1, a center apparatus 2, and a terminal 3. Here, only one server 1 and one terminal 3 are shown in the drawings, but the system may comprise a plurality of servers or terminals. Further, in the drawings, the server 1 and the center apparatus 2 are treated as different apparatuses connected through a communication line such as a network, but these apparatuses may be implemented by one computer. The terminal 3 is a handy terminal provided with a barcode reader, a smartphone provided with a camera capable of reading barcodes, and the like, which comprises a control unit 31, a storage unit 32, a display unit 33, an operation unit 34, and a communication unit 35, and is communicably connectable to the center apparatus 2. According to the present embodiment, each terminal 3 holds unique terminal identification information (MAC address, production number (IMEI), etc.)

[Server]

The server 1 operates as a web server. This server 1 holds instruction data in which information defining at least one display screen (screen description information) is described.

The server 1 is connected to the center apparatus 2 through a network. In response to a request in HTTP (Hyper Text Transfer Protocol) received from the center apparatus 2, the server 1 delivers various data relating to the request to the center apparatus 2 which is the source of the request. According to an example of the present embodiment, the server 1 receives a plurality of types of requests. For example, the server 1 receives a plurality of types of requests such as a request for an acceptance process, a request for an inspection process, a request for a stock operation, a request for a shipment operation, and so on. According to an example of the present embodiment, different access destination URLs may be set for different types of requests. Namely, in order to requesting an acceptance process, the center apparatus 2 accesses a predetermined first URL, whereas in order to requesting an inspection process, the center apparatus 2 accesses a (predetermined) second URL which is different from the first URL. Then, the server 1 performs a process corresponding to each type of request, and delivers data (instruction data) defining an user interface which should be displayed at the terminal 3 in response to each request, to the center apparatus 2, i.e., the source of the request. According to the present embodiment, the server 1 is set to communicate only with the center apparatus 2. A method for such setting can be any widely known methods such as a method using a verification process. Thus, a detailed explanations therefor is omitted here.

Here, the instruction data transmitted by the server 1 is described in XML (eXtensible Markup Language). Further, hereinbelow, among the elements displayed on the screen by the screen description information, an element which receives an instructing operation by a user (button, input field, menu, etc.) is referred to as an operation guide element. In the present embodiment, the screen description information provided by the server 1 defines an user interface of an application viewed on the terminal 3 side.

[Center Apparatus]

The center apparatus 2 is an ordinary server computer comprising a CPU and a storage unit, and operates in accordance with a previously installed program. The program may be provided by being stored in a computer readable storage medium such as a DVD-ROM, stored in the storage unit of the center apparatus 2, and executed by the CPU. As the CPU of the center apparatus 2 executes the program, the center apparatus 2 functionally has a structure shown in FIG. 2. Namely, the center apparatus 2 functionally comprises a control unit 21, a communication management unit 22, a communication control unit 23, a communication unit 24, an HTTP client unit 25, an information conversion unit 26, and a request reception unit 27.

Figure 2:
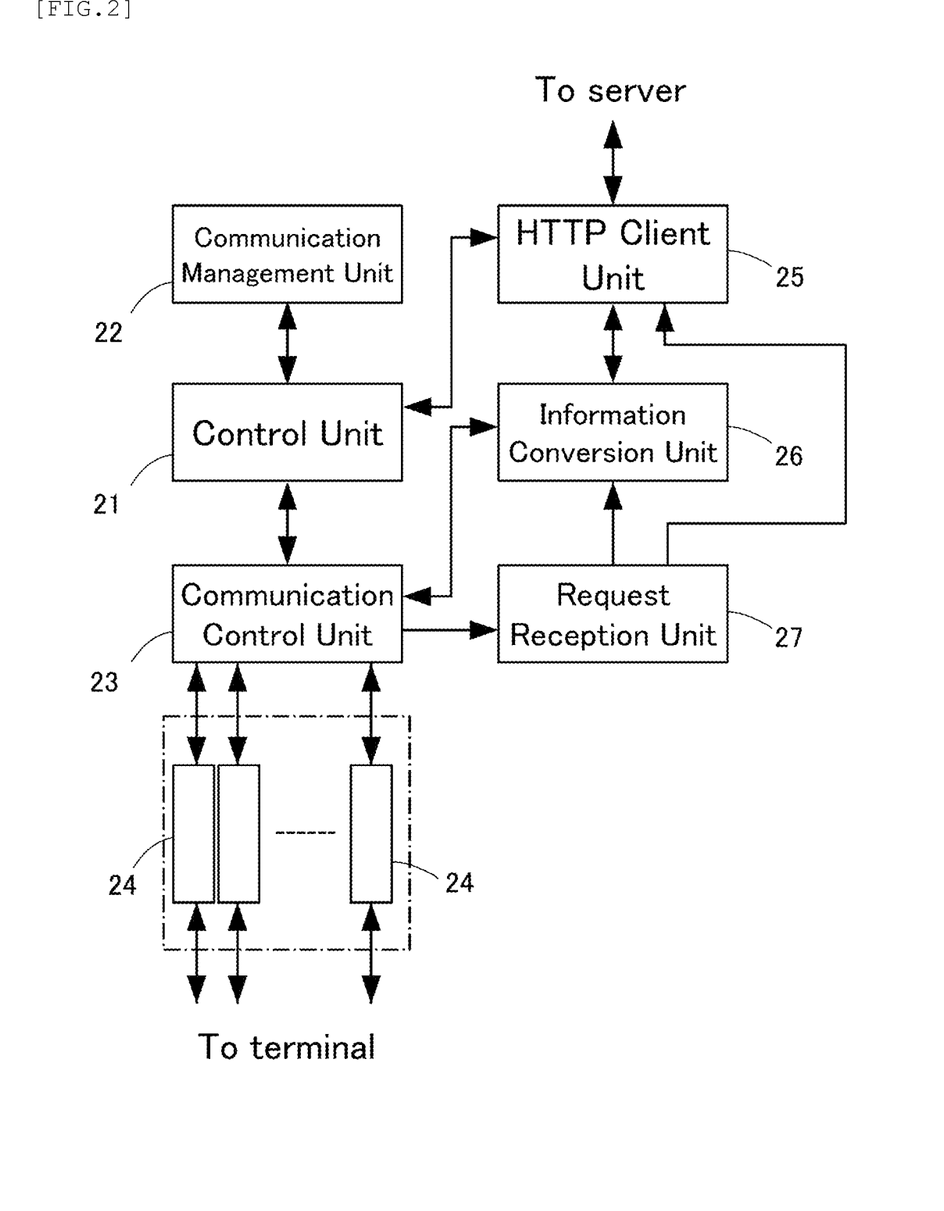
FIG. 2 is a functional block diagram showing an example of a center apparatus 2.

The control unit 21 records communication management information input from the communication management unit 22, communication unit status information input from the communication control unit 23 and representing the status of the communication unit 24, and server-side status information input from the HTTP client unit 25 and representing the status of the communication with the server 1.

The communication management unit 22 reads out the communication unit status information recorded in the control unit 21, and displays the communication unit status information for a manager. Further, the communication management unit 22 receives an instruction for setting the status of the communication unit 24 from the manager, and outputs the received instruction to the control unit 21 as the communication management information.

The communication control unit 23 receives an input of information which has been received by the communication unit 24 from the terminal 3, and outputs the received information to the request reception unit 27. Further, the communication control unit 23 receives an input of an object to be delivered, such as a program for the terminal 3, from the information conversion unit 26, and outputs the received object to be delivered (which may be encrypted) to the communication unit 24.

According to an example of the present embodiment, the terminal 3 stores a group identifier (gid), in addition to terminal identification information (for example, MAC address, product number (IMEI), etc.) Further, as exemplified in FIG. 3, the storage unit of the center apparatus 2 stores a corresponding process information table in which a group identifier (gid) is associated with request type information which represents a process is to be requested (information which represents a type of request to be requested to the server 1). Here, a common request type information may be associated with a plurality of group identifiers. In addition, when a group identifier is represented by a numeral value, a common request type information may be associated with a plurality of group identifiers designated by a numerical value range. The request type information (information representing a process to be requested) may be, specifically, an URL corresponding to each request (an URL on the server 1 side, corresponding to the request type).

Figure 3:
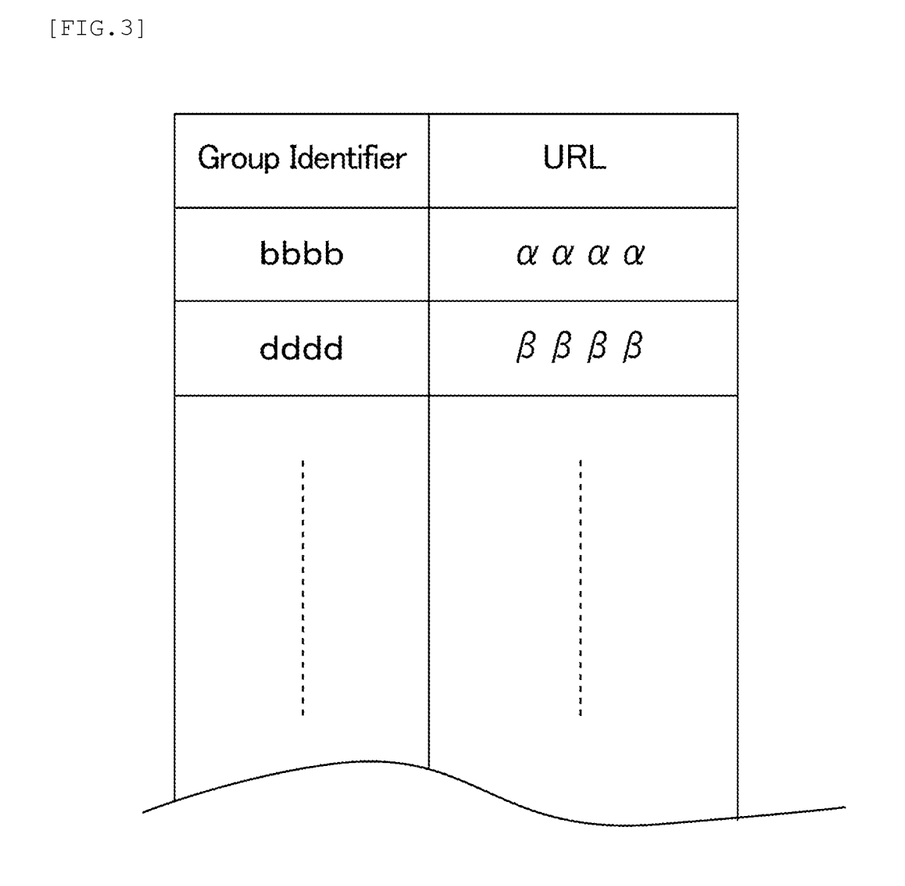
FIG. 3 is an explanatory view showing an example of data held by the center apparatus 2.

According to the present embodiment, when the terminal 3 requests the center apparatus 2 to start communication, the group identifier stored in the terminal 3 is transmitted to the center apparatus 2. When the communication unit 24 receives the communication start request from the terminal 3, the communication control unit 23 acquires a terminal identifier (_si) associated with the terminal identification information of the terminal 3, and the group identifier, which are included in the communication start request. Then, the communication control unit 23 reads out an URL associated with the acquired group identifier (gid), with reference to the corresponding process information table. The communication control unit 23 outputs the read-out URL to the request reception unit 27 as an URL requested by the terminal 3, and accesses the server 1.

During this first access, information for specifying a session (cookies, etc.) is not transmitted to the server 1.

Further, the communication control unit 23 receives an input, from the information conversion unit 26, of an object to be delivered which has been provided by the server 1, such as a program for the terminal 3, and outputs the object to be delivered (which may be encrypted) to the communication unit 24. When the information received from the server 1 includes information for specifying a session (cookies, etc.), the communication control unit 23 stores the session specifying information in association with the terminal identifier (_si) of the terminal 3.

Further, after the start of the communication between the communication unit 24 and terminal 3, if the communication unit 24 receives an URL (which may include data input by the terminal 3 as a parameter) from the terminal 3, the communication control unit 23 outputs the URL as an URL requested by the terminal 3, together with session specifying information which is stored in association with the terminal identifier (_si) of the terminal 3, to the request reception unit 27.

When the communication unit 24 receives a request to restart communication, from the terminal 3, the communication control unit 23 refers to the terminal identifier (_si) of the terminal 3 which has requested the communication restart to the communication unit 24, and searches for session specifying information stored in association with the terminal identifier (_si) of the relevant terminal 3. At this time, if session specifying information stored in association with the terminal identifier (_si) of the terminal 3 is present, the communication control unit 23 outputs the request including the session specifying information to the request reception unit 27. Thereby, even if there is a period of time during which the terminal 3 cannot communicate with the communication unit 24 of the center apparatus 2, when the communication restarts, processes performed before the communication became unavailable can be continued.

The communication unit 24 is, for example, a network interface which receives an access from the terminal 3 side, and buffers the URL (which may include data input by the terminal 3, as a parameter) received from the terminal 3. The communication unit 24 outputs the buffered URL to the communication control unit 23. Further, the communication unit 24 transmits the data to be delivered, which has been input from the communication control unit 23, to the terminal 3 which is accessing the center apparatus 2. As an example, the communication unit 24 is a network interface which performs communication using wireless LAN standards, such as 802.11b, g, n, and the like.

The HTTP client unit 25 transmits a request for instruction data corresponding to the URL (Uniform Resource Locators) input from the request reception unit 27, to the server 1, using the HTTP protocol. Then, the HTTP client unit 25 receives the requested instruction data from the server 1, and outputs the received instruction data, etc., to the information conversion unit 26.

When the information conversion unit 26 receives the input of the instruction data from the HTTP client unit 25, the information conversion unit 26 generates a program which can be executed by the terminal 3 side (program for the terminal 3) on the basis of the input instruction data, and outputs the generated program to the communication control unit 23. The operations of the information conversion unit 26 will be explained in detail below.

The request reception unit 27 receives URL information from the communication control unit 23. According to the present embodiment, The URL information may be encrypted using a predetermined encryption method such as the AES (Advanced Encryption Standard), etc. As described below, when encryption is performed, a key to be used for encrypting and decrypting the information has been previously installed in the terminal 3 and the center apparatus 2. The terminal 3 transmits URL specifying information or a program acquisition request which has been encrypted using the installed key. Then, the request reception unit 27 decrypts the information using the installed key, and extracts the URL information.

According to the present embodiment, the communication unit 24 performs ordinary TCP/IP socket communication, and transmits the generated program to the terminal 3 which is the source of the request.

Further, according to an example of the present embodiment, the above-mentioned data acquisition request using the URL between the center apparatus 2 and the terminal 3, is different from the request using the HTTP protocol, and further, unique identification information (request identification information) is added to the request using the URL. For example, the program acquisition request is expressed by a format: REQUESTPROGRAM_ri=N Here, "_ri=N" means that the request identification information (_ri: Request ID) is the number N.

The request reception unit 27 holds the request identification information of, at least, a request that has been received last. When the request reception unit 27 receives a request which includes request identification information same as the request identification information of the request that has been received last, the request reception unit 27 outputs information representing that the previous request has been received again, to the information conversion unit 26.

[Communication Unit Status Information and Communication Management Information]

Here, operations of the communication unit 24 will be explained. According to the present embodiment, the communication unit 24 executes a plurality of communication threads. Specifically, in response to a communication start request from the terminal 3, i.e., the communication destination, the communication unit 24 generates a thread corresponding to the terminal 3. The communication unit 24 acquires a terminal identifier (_si: including, for example, a MAC address, a product number (IMEI), etc.) in the communication start request from the terminal 3. As already mentioned above, the center apparatus 2 holds this terminal identifier in association with the session identification information which the center apparatus 2 has acquired from the server 1 by accessing thereto in response to the request from the terminal 3 corresponding to the terminal identifier. Then, after the start of communication, the center apparatus 2 generates a request to the server 1, on the basis of the request received from the terminal 3, and transmits the generated request to the server 1. At the time of this transmission, the center apparatus 2 also transmits, to the server 1, the session identification information which has been held in association with the terminal identifier of the terminal 3, i.e., the source of the request. Thereby, the server 1 determines the information to be transmitted in response to the request, on the basis of the session identification information. Then, the server 1 transmits the determined information to the center apparatus 2. The center apparatus 2 generates information to be transmitted to the terminal 3, on the basis of the received information.

When no communication with the terminal 3 is performed for a predetermined period of time, the execution of the thread corresponding to the terminal 3 is terminated.

When the communication unit 24 executes a plurality of communication threads, the communication control unit 23 sequentially extracts information received through each communication thread, and sequentially outputs the extracted information to the request reception unit 27.

Further, the communication unit 24 may store a port number of the TCP protocol in association with a status code (status) regarding the communication with the corresponding terminal 3 and a comment, with respect to each terminal 3. Here, the status code may mainly express whether the terminal is online (in communication) or offline. In the explanation of the present embodiment, the TCP protocol is used for communication, but the protocol is not limited thereto, and other protocols such as UDP, may be used.

[Data Input Program]

Next, operations of the information conversion unit 26 will be explained. On the basis of the screen description information part included in the instruction data input from the HTTP client unit 25, the information conversion unit 26 generates a data input program module for the terminal 3 (an instruction string in the data format capable of being interpreted by the terminal 3). According to the present embodiment, the instruction data may include a plurality of pieces of screen description information, corresponding to the results of the branching process. The information conversion unit 26 generates a plurality of data input program modules respectively corresponding to the plurality of pieces of screen description information included in the instruction data.

Figure 4:
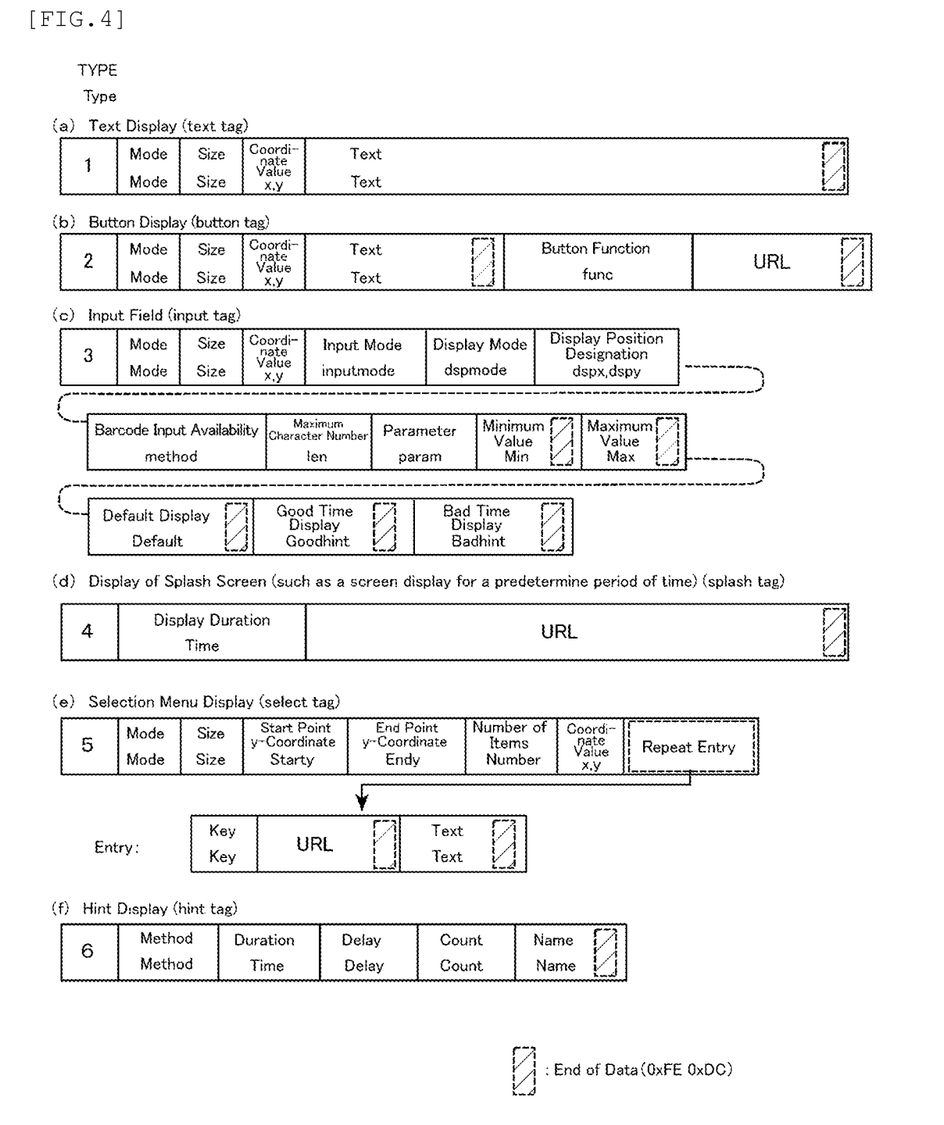
FIG. 4 is an explanatory view showing an example of a data format which can be interpreted by a terminal 3.

For example, the screen description information may include a plurality of types of regulations on screen elements, as shown in FIG. 4(*a*) to FIG. 4(*f*). FIG. 4(*a*) shows elements for text display, FIG. 4(*b*) shows elements for button display, FIG. 4(*c*) shows elements for input field display, FIG. 4(*d*) shows elements for a splash screen (a screen displayed for only a certain period of time), FIG. 4(*e*) shows elements for a selection menu, and FIG. 4(*f*) shows elements for hint display, which respectively correspond to (a) <text> tag, (b) <button> tag, (c) <input> tag, (d) <splash> tag, (e) <select> tag, and (f) <hint>tag, in the XML document, i.e., instruction data.

As an XML document element providing instructions regarding a button displayed on a screen, if a screen element description using the "button" tag is described as "<button mode=aaa size=bbb x=ccc y=ddd func=fff url=ggg>eee</button>", the information conversion unit 26 converts this description to a predetermined data format which can be interpreted by the terminal 3 side, and provides a data stream as shown in, for example, FIG. 4(*b*). FIG. 4 shows instructions into which the descriptions relating to the six types of screen element, i.e., text, button, input field, splash screen, selection menu, and hint information are respectively converted by the information conversion unit 26.

For example, FIG. 4(*b*) shows a data format which includes "Type" information of "2" indicating a button, "Mode" indicating the display mode of the button, "Size", "x" and "y" indicating the display position coordinates on the screen, "Text" displayed as a button caption (in the above example, the "eee"), "Button Function (func)" indicating the function of the button (such as transmission button, etc.), and "url" indicating the URL (if any) which is to be read when the button is clicked. The data which does not have a fixed length, such as text, URL, etc., has a delimiter of "0xFE 0xDC".

According to the present embodiment, the data format (as well as the XML DTD corresponding thereto) defining the interface of an input field, which is one of the operation guide elements, includes "method" indicating whether or not the barcode input is allowed, conditions (operation conditions) regarding information to be input by operation, such as "max" and "min" defining the maximum value and the minimum value of the input value, and information specifying a process to be performed depending on whether or not the operation conditions are satisfied (goodhint, badhint) (FIG. 4(*c*)).

[Branching Process]

The information conversion unit 26 according to the present embodiment makes the terminal 3 execute instructions for a branching process included in the instruction data, and instructions for a screen presenting process corresponding to the result of the branching process. Here, the branching process is a process for differentiating operations depending on the conditions.

Figure 5:
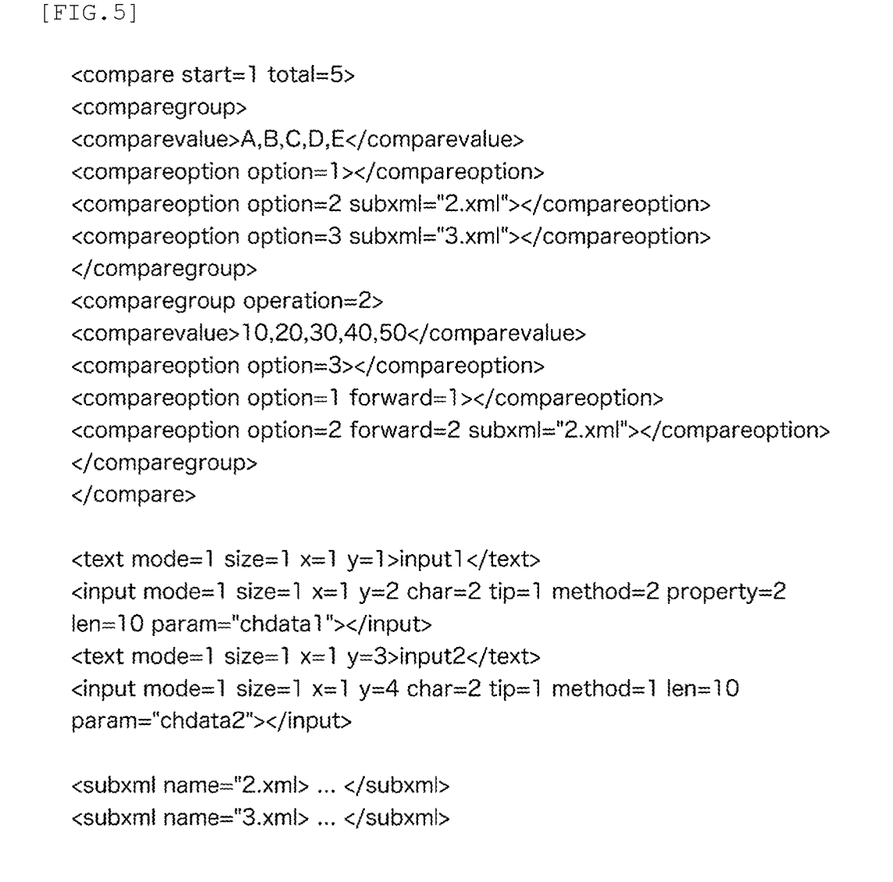
FIG. 5 is an explanatory view showing an example of instruction data.

According to an example of the present embodiment, the branching process is defined as a process for performing branching on the basis of comparison between a value input at the terminal 3 and a value designated by the instructions at the branching process. Specifically, the instructions at the branching process according to the present embodiment is defined by "compare tag" as shown in FIG. 5. The "compare tag" includes at least one comparison element (a series of description located between "comparegroup" tags; P). Each comparison element includes a group of values to be compared ("comparevalue" tag; A), and a branching instruction group ("compareoption" tag; B). The branching instruction group includes at least one condition for comparison with the value input at the terminal 3, and at least one piece of information for specifying screen description information regarding the screen to be presented when each condition for comparison is satisfied. Namely, the branching instruction group defines branching parameters relating to the branching conditions, and the branching instruction group corresponds to an array of the branching parameters.

According to the present embodiment, the comparison conditions are defined as the following seven types, for explanation, which are:

(1) the value to be compared is equal to the input value;
(2) the input value is greater than the value to be compared;
(3) the input value is smaller than the value to be compared;
(4) the input value is included in the group of values to be compared;
(5) the input value is not included in the group of values to be compared;
(6) the value to be compared has already been matched (compared) ; and
(7) the value to be compared has not been matched (compared), yet.

The information conversion unit 26 generates a program (instruction string described in a data format which can be interpreted by the terminal 3) for the terminal 3 to execute a step for storing the group of values to be compared as an array; a step for displaying input fields for the values; a step for comparing the stored array with the input values, each time when the value is input, on the basis of the comparison conditions in the order included in the branching instruction group; and a step for displaying a screen on the basis of the screen description information corresponding to the comparison condition which has been satisfied first in the comparison order.

The content of this program generation process will be explained using an example that a program for the terminal 3 including the branching process is generated from a part of the instruction data shown in FIG. 5.

When the information conversion unit 26 finds out a <compare> tag in the instruction data, the information conversion unit 26 generates a program module for performing a initialization process for the comparison process (initialization module). The program code for the initialization process is written, for example, to allocate: a region which stores a plurality of pieces of flag information each indicating whether or not the comparison process for each of the values in a group designated as values to be compared (a group of values designated by the <comparevalue> tag) has been complete, the number of pieces of the flag information being the same as the number of values in the group; and a region which stores a pointer value designating a value to be subjected to the next comparison. Further, a region for storing an input value and a result of the comparison process regarding the input value is allocated, with respect to each input field.

Specifically, in the example shown in FIG. 5, the option (start) (here, "1") for designating the first value to be compared is described, as an option for the <compare> tag. Further, the option (total) (here, "5") for designating the number of values is described for designating the number of values to be compared. Then, the information conversion unit 26 generates the following program for the terminal 3. Namely, the information conversion unit 26 generates an initialization module executing the steps (a) to (c), the steps being (a) allocating a region for storing five pieces of flag information and a region for storing pointer information, (b) setting the initial value "1" (the value designated by the start option) as the pointer information, and (c) initializing the flag information by setting a value "not yet compared" indicating that the comparison has not been performed, for all pieces of the flag information.

Further, the information conversion unit 26 generates a program module (interface processing module) for performing an input interface process of displaying input fields and receiving inputs, on the basis of the screen information description described in relation to the <compare> tag (here, the screen information description described right after the end tag (</compare>) corresponding to the <compare> tag). In addition, input fields to be displayed (screen elements corresponding to the <input> tags) are respectively associated with the branching instruction groups defined by the <comparegroup> tag within the <compare> tag. Here, the association is performed in the order of description (in the order of appearance). FIG. 5 shows instructions (two <input> tags) to display two input fields, i.e., first and second input fields, corresponding to the number of <comparegroup>.

Further, the information conversion unit 26 generates a program module (comparison processing module) for executing a comparison process with respect to each of the displayed input fields, the comparison process being executed on the basis of the branching instruction group included in the <comparegroup> tag corresponding to each input field (corresponding branching instruction group), when a value is input for each input field. According to the program code of the comparison processing module, with respect to a plurality of comparison conditions included in the corresponding branching instruction group corresponding to the input field to which a value has been input, whether or not the input value satisfies each of the comparison conditions is sequentially determined.

The information conversion unit 26 generates information which includes an instruction string capable of being interpreted by the terminal 3, and instructs the terminal 3 to execute the branching process, as well as information which is written in a data format capable of being interpreted by the terminal 3, and allows the data input on the basis of the screen description information on the terminal 3. Thereafter, the information conversion unit 26 stores these information items as objects to be delivered to the terminal 3 side.

Then, the information conversion unit 26 encrypts the stored objects to be delivered using a previously installed key, and outputs the encrypted objects to be delivered to the communication control unit 23. Here, the encryption method may be, for example, AES, etc. After performing the output to the communication control unit 23, the information conversion unit 26 maintains the status of storing the objects to be delivered. Therefore, when receiving information, from the request reception unit 27, that a request same as the previous request is received again, the information conversion unit 26 outputs the stored objects to be delivered to the communication control unit 23, again. Further, when the information conversion unit 26 receives an input of new instruction data from the HTTP client unit 25, the information conversion unit 26 may delete the stored previous objects to be delivered. Thereby, duplicate transmission of the information can be inhibited, and no countermeasure for the duplicate transmission is required at the server 1 side.

The communication control unit 23 may acquire request identification information _ri included in a program acquisition request which has been received by the request reception unit 27 from the terminal 3 side, and may store the request identification information _ri in association with information for identifying the request source terminal 3. When the communication control unit 23 receives the objects to be delivered from the information conversion unit 26, the communication control unit 23 may read out the request identification information _ri stored in association with the information for identifying the terminal 3 which is the delivery destination of the objects to be delivered, and deliver the objects to be delivered together with the read-out request identification information _ri, to the delivery destination terminal 3.

[Other Processes of Information Conversion Unit 26]

Further, according to the present embodiment, the information conversion unit 26 may receive an input of the result of processing at the terminal 3 and execute processes on the basis of the result of processing. For example, when the branching process is executed at the terminal 3, the terminal 3 receives a result of determination with respect to each value in the group of values to be compared. The information conversion unit 26 receives an input of an array of the determination results, and transmits the determination result array through the HTTP client unit 25 to the server 1, to allow the determination result array to be subjected to other processes such as an aggregation process, etc.

[Terminal]

The control unit 31 of the terminal 3 operates in accordance with a program stored in the storage unit 32, interprets instructions input from the communication unit 35, and controls each unit in accordance with the received instructions. Specific operations of the control unit 31 will be explained in detail below.

The storage unit 32 is a computer readable information storage medium for storing a program, such as a RAM (Random Access Memory), a flash memory, or the like. The storage unit 32 has a readable/writable portion in at least a part thereof and may also operate as a work memory which stores information necessary for the operations of the control unit 31. In addition, according to the present embodiment, the storage unit 32 stores information regarding a previously set key for encryption or decryption, a group identifier, or the like.

The operation unit 34 is a key pad, a barcode reader, or the like, which receives an input of information in response to the operation by a user, and outputs the received information to the control unit 31. According to the present embodiment, the operation unit 34 comprises a key pad (including keys for inputting numerical values such as numeric keys) 34a, and a barcode reader 34b.

The display unit 33 is a display for displaying information in accordance with the instructions input from the control unit 31. Specifically, the display unit 33 may be a dot-matrix liquid crystal display, but is not limited thereto. The communication unit 35 outputs instructions received from the center apparatus 2 to the control unit 31, or transmits information to the center apparatus 2 in accordance with instructions input from the control unit 31.

Next, operations of the control unit 31 of the terminal 3 according to the present embodiment will be explained. The control unit 31 according to the present embodiment functions to operate an ordinary operating system, and to operate applications such as a web browser, etc., under the control of the operating system.

Further, an interpreter program is installed in the terminal 3 according to the present embodiment, for executing a data input program provided by the center apparatus 2 and transmitting/receiving data to/from the center apparatus 2. When a user would like to communicate with the center apparatus 2 and takes advantage of a service provided by the server 1, the user activates the interpreter program.

When the control unit 31 operating in accordance with the interpreter program is activated, the control unit 31 performs an initialization process. At this time, the control unit 31 accesses the address of the center apparatus 2, which has been previously set. At the time of this access, the control unit 31 adds unique request identification information to each request. Specifically, during the initialization process, the control unit 31 initializes the variable i expressing the request identification information by a number, to "1".

The control unit 31 adds a character string "_ri=1" (here, "1" is a value expressed by the variable i) as the request identification information, to the program acquisition request. Then, the control unit 31 outputs information inquiring whether or not encryption is required, to the communication unit 35, to transmit the information to the center apparatus 2. The center apparatus 2 which has received the information of inquiry determines whether or not the encryption should be performed, in accordance with the settings set in advance.

The center apparatus 2 transmits the result of the determination to the terminal which is the transmission source of the inquiry information. When the control unit 31 of the terminal 3 receives information stating that the encryption is required, from the center apparatus 2, the control unit 31 encrypts a designated URL and a request for acquiring a program from the URL, using a previously installed encryption key (which may also be a decryption key). Here, the encryption method may be, for example, AES. The control unit 31 stores the data obtained after the encryption in the storage unit 32, as objects to be transmitted.

On the other hand, when the control unit 31 of the terminal 3 receives information that encryption is not required, from the center apparatus 2, the control unit 31 stores a designated URL and a request for acquiring a program request from the URL in the storage unit 32, as objects to be transmitted.

The control unit 31 outputs the objects to be transmitted which are stored in the storage unit 32, to the communication unit 35, to transmit the objects to the center apparatus 2.

Further, the control unit 31 activates a timer (not shown). When the control unit 31 receives data from the communication unit 35 before a predetermined timeout period has passed, the control unit 31 increments the variable i expressing a numeral value as the request identification information. The control unit 31 stores the received data in the storage unit 32, and decrypts the data using the previously installed key for encryption and decryption. Then, the control unit 31 executes a program included in the decrypted data.

The data received from the communication unit 35 is provided with request identification information _ri which was added to the program acquisition request in the past. The control unit 31 refers to the relevant request identification information _ri and compares the value expressed by the numeral and the variable i (before the variable i is incremented). Then, when these values are identical, the control unit 31 increments the variable i understanding that the data has been normally accepted, stores the data in the storage unit 32, decrypts the data using the previously installed key for encryption and decryption, and executes the program included in the decrypted data.

When the value expressed by the request identification information _ri added to the received data is not identical with the value expressed by the variable i, the control unit 31 understands that a malfunction occurs, and functions to display a screen informing of the occurrence of an error.

When the control unit 31 cannot receive data from the communication unit 35 before a predetermined timeout period has passed, the control unit 31 functions to display a screen informing of a communication error. This screen is set to be capable of receiving an instruction for a retry. When the retry is instructed, the control unit 31 outputs the object to be transmitted which has been stored in the storage unit 32, to the communication unit 35, again, to transmit the object to the center apparatus 2. With respect to the object to be transmitted again, the value of the request identification information is the same as the value for the previous transmission.

Processes of the control unit 31 which executes the program included in the decrypted data will be explained, with reference to the example shown in FIG. 5.

The control unit 31 performs the initialization process for the comparison process. The initialization process is performed to allocate, in the storage unit 32, a region which stores a plurality of pieces of flag information each indicating whether or not the comparison process for each of the values in a group of values to be compared (a group of values designated by <comparevalue> tag) has been complete, the number of pieces of the flag information being the same as the number of values in the group (in the example of FIG. 5, the number being 5), and a region which stores a pointer value designating a value to be subjected to the next comparison. Further, a region for storing an input value and a result of the comparison process regarding the input value is allocated in the storage unit 32, with respect to each input field. The pointer information is initialized to "1" (the value designated by the start option), and the flag information is initialized to "not yet compared" indicating that the comparison has not been performed.

Next, the control unit 31 functions to display the input field on the basis of the screen information description described right after the <compare> tag. In FIG. 5, two input fields (corresponding to the <input> tags), i.e., first and second input fields, are displayed corresponding to the number of <comparegroup>.

Under these conditions, the control unit 31 waits for the input of a value. When a user operates the operation unit 34 and inputs information, the control unit 31 executes a branching process corresponding to the input field which has received the input of the information.

For example, when the user inputs "A" to the first input field, the control unit 31 starts processes corresponding to the first input field, and first, determines whether or not the value to be compared is equal to the input value "A" (compareoption option=1). Here, the value of the pointer information is "1", and thus, the value to be compared is "A". In this case, the value to be compared is equal to the input value, and thus, the condition is determined as satisfied.

In this case, the control unit 31 further waits for another input of a value. When the user performs the next input of "1" to the second input field, the control unit 31 adds "1" to the current value in the second input field (unless otherwise specified, the current value is initialized to "0"), on the basis of the option of the <compare> tag. Here, the value after the addition is "1".

Then, the control unit 31 starts processes corresponding to the second input field. In this case, program codes for the comparison process are generated in accordance with the order of description shown in FIG. 5. Therefore, first, whether or not the value overwritten in the second input field is smaller than the value specified by the pointer information (value to be compared) is determined (compareoption option=3). Here, the pointer information remains "1", and thus, the value to be compared is "10" (the first value for the <comparevalue> in the second <comparegroup>). Therefore, the condition is satisfied. Since nothing is specifically designated for this process, the control unit 31 waits for another input of a value.

When the user further performs an input of "9" to the second input field, the control unit 31 adds "9" to the current value "1" of the second input field, and obtains the resulting value "10".

Then, whether or not the value overwritten in the second input field is smaller than the value specified by the pointer information (value to be compared) is determined (compareoption option=3). Here, the pointer information remains "1", and thus, the value to be compared is "10". Therefore, the condition is not satisfied.

Then, the control unit 31 refers to the next branching instruction, and determines whether or not the value to be compared is equal to the value overwritten in the second input field (compareoption option=1). Here, these values are identical, and thus, this condition is satisfied. In accordance with the forward option relating to this condition, the control unit 31 sets the flag information corresponding to the value indicated by the current pointer information, to "already compared". Then, the control unit 31 increments the pointer information to become "2". Further, the control unit 31 stores the values input to the respective input fields and the comparison results (information indication "equal" in both results) in the region allocated in the storage unit 32.

In FIG. 5, the option to determine whether or not the value input to the input field is larger than the value to be compared is specified as compareoption option=2. However, this option is not performed in the present example.

Similarly, the processes are executed with respect to each value in the group of values to be compared. When the result of each comparison process for each obtained value, the control unit 31 terminates the processes, and transmits the input values, the comparison results, and requests for processing the input values (including URLs for the processing services), to the center apparatus 2. At this time, the control unit 31 adds a character string "_ri=N" (here, N is a value representing the variable i) as request identification information, to the request for processing.

Then, the control unit 31 encrypts the data including these input values, comparison results, and processing requests, using a previously installed encryption key (the key can also be a decryption key). Here, the encryption method may be, for example, AES. The control unit 31 stores the encrypted data in the storage unit 32 as an object to be transmitted. Further, the control unit 31 outputs the object to be transmitted to the communication unit 35, to transmit the object to the center apparatus 2.

The control unit 31 activates a timer (not shown). When the control unit 31 receives a response from the center apparatus 2 through the communication unit 35 before a predetermined timeout period has passed, the control unit 31 increments the variable i expressing a numeral value as the request identification information. On the other hand, when the control unit 31 cannot receive a response from the center apparatus 2 before the predetermined timeout period has passed, the control unit 31 functions to display a screen informing of a communication error. This screen is set to be capable of receiving an instruction for a retry. When the retry is instructed, the control unit 31 outputs the object to be transmitted which has been stored in the storage unit 32, to the communication unit 35, again, and to transmit the object to the center apparatus 2. With respect to the object that is output again, the value of the request identification information is the same as the value for the previous transmission.

Determination as to whether or not the input value has already been subjected to matching (comparison) at the control unit 31, is performed as follows. Namely, the input value is retrieved from the group of values to be compared, and the position (the position from the top) of the input value is obtained. Then, on the basis of the obtained position information, the flag information corresponding to the position is referred to, to find out whether or not the value of the flag information indicates the status of "already been matched" (compared), and thereby perform determination.

Whether or not the input value is included in the group of values to be compared is determined by searching for the input value in the group of designated values. When the input value can be retrieved, the input value is determined as being included in the group, whereas when the input value cannot be retrieved, the input value is determined as not being included in the group.

If the pointer information is "2", and the user inputs "X" to the first input field, the input value is not equal to "B" which is the value to be compared indicated by the pointer information. Thus, the screen defined by 2.xml or 3.xml is displayed.

Here, by 2.xml or 3.xml, not only a character string such as "input value is wrong", but also a button to "return" to the input screen, a button for resetting the input field to the initial value, and the like, are displayed.

In the example of FIG. 5, processes continue until each value becomes "equal to" the respective value to be compared. Thus, the values of the comparison result which are to be transmitted to the center apparatus 2 are values indicating such as "1, 1, 1, 1, 1", which means that all condition numbers are "1", i.e., all comparison results are determined as "equal".

[Operation]

Next, operations of the data processing system including the center apparatus 2 according to the present embodiment will be explained. According to the present embodiment, an application program which executes the requested data processing is installed on the server 1 side. The application program is described in a way so that information to be input/output can be delivered by HTTP protocol. Specifically, the application program can be described by C#, Java (registered trademark), and a servlet thereof, as well as by a scripting language such as JavaScript, PHP, ASP (Active Server Pages), and the like. In the following, as an example of data processing, an example of a stock processing program and a shipment processing program described by Java (registered trademark), as application programs for inventory management, will be explained. The stock processing program receives product ID information of a product, and information regarding the number of pieces of the product, and updates a product database by adding the received piece number to the piece number information which has been stored in association with the relevant product ID information in the product database. The shipment processing program receives product ID information of a product, and information regarding the number of pieces of the product, and updates a product database by subtracting the received piece number from the piece number information which has been stored in association with the relevant product ID information in the product database.

Accordingly, in either of the programs, the instruction data installed in the server 1 is an XML document which defines an interface having input fields for the product ID and the piece number, an "input" button, and "stock" or "shipment" button, arranged therein for the information input. Further, the server 1 stores a Java (registered trademark) program for executing processes corresponding to the respective processes.

Figure 6:
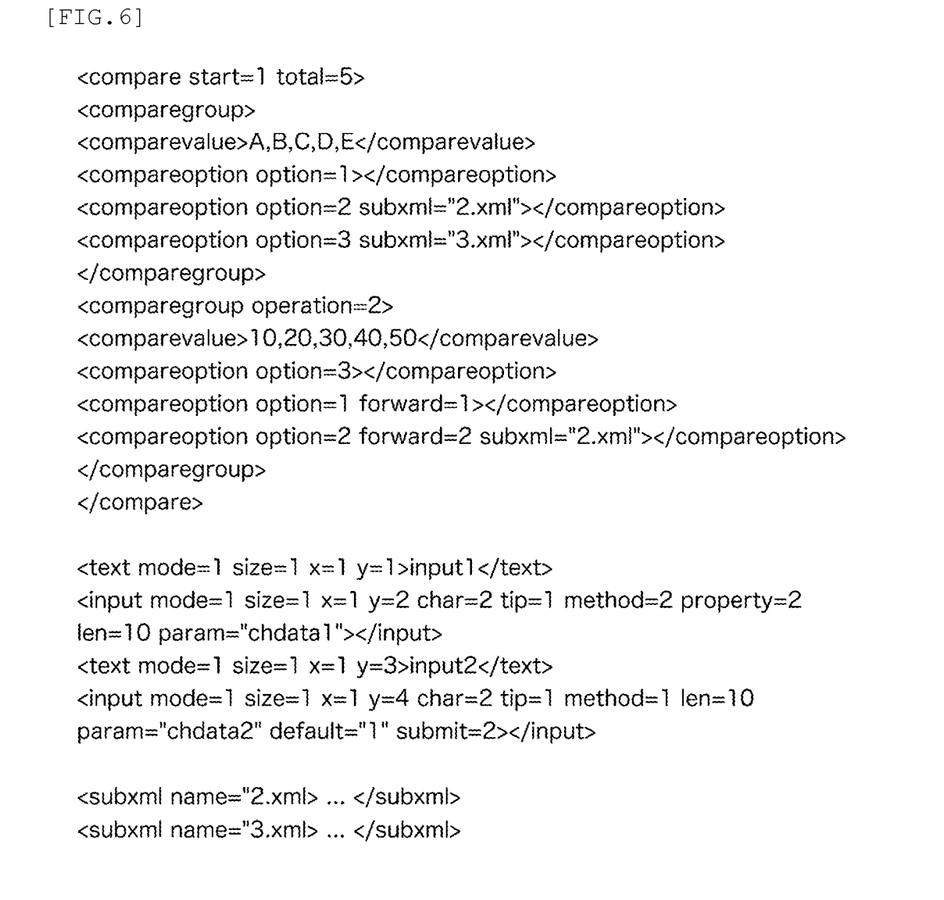
FIG. 6 is an explanatory view showing another example of instruction data.

FIG. 6 shows an example of an XML document defining the interface. In the example shown in FIG. 6, the first input field is used as an input filed for the product ID, and the second input field is used as an input field for the piece number.

The input field for the product ID accepts the input of a barcode (method=2), whereas the input field for the piece number does not accept the input of a barcode (method=1).

Figure 7:
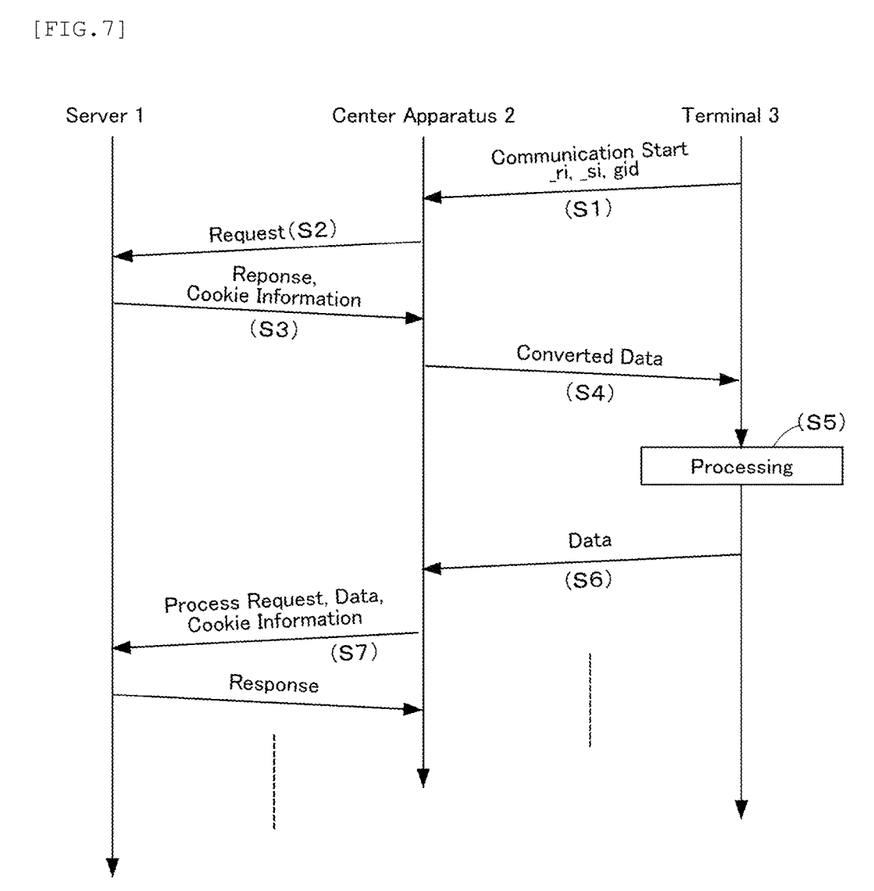
FIG. 7 is a flow chart showing an example of communication in a data processing system according to an embodiment of the present disclosure.

Further, as exemplified in FIG. 7, when the terminal 3 is initialized, the terminal 3 transmits a communication start request to the center apparatus 2 (S1). The communication start request includes a terminal identifier (_si) stored in the terminal 3, request identification information (_ri), and a group identifier (gid) stored in the terminal 3. At this stage, the request identification information is in the initialized state, i.e., in the above mentioned example, the request identification information is expressed by the character string "_ri=1".

Further, at the time of transmitting the communication start request, the terminal 3 makes an inquiry to the center apparatus 2 as to whether or not encryption is required. Upon receiving the inquiry, the center apparatus 2 determines whether or not the encryption is required, on the basis of the previously set settings, and notifies the determined result to the terminal 3. The terminal 3 receives the notification of the determined result, and stores the content of the determination (information expressing whether or not the encryption is required).

Namely, here, if the center apparatus 2 determines that the encryption should be performed, the terminal 3 receives a reply from the center apparatus 2, stating that the encryption is required. In this case, during the communication thereafter, the terminal 3 generates data by encrypting the request, and transmits the encrypted data to the center apparatus 2. If the terminal 3 receives a reply from the center apparatus 2, stating that the encryption is not required, during the communication thereafter, the terminal 3 transmits the request to the center apparatus 2 without encrypting the request. At the center apparatus 2, a thread corresponding to the terminal 3 and executed by the communication unit 24 accepts and buffers the request or the encrypted data.

According to the present embodiment, whether or not encryption is required is not determined at the terminal 3 side, but determined at the center apparatus 2 side. Therefore, if the encryption is required, the encrypted communication can be performed without asking each operator who operates the terminal 3 to determine whether or not the encryption is required, nor without previously setting the terminal 3 therefor. Namely, the initial communication (inquiry as to whether or not the encryption is required) is not encrypted, but the communication thereafter can be set to be encrypted if the system manager determines to encrypt the communication at the server side.

At this time, the center apparatus 2 acquires the terminal identifier (_si) of the terminal 3. Further, the center apparatus 2 acquires the group identifier (gid) of the terminal 3, and reads out the URL (URL corresponding to the process which should be performed) associated with the acquired group identifier. In the present example, the URL is either the URL of the server 1 corresponding to the stock processing program, or the URL of the server 1 corresponding to the shipment processing program. Accordingly, in the present embodiment, even if no setting changes are performed at the terminal 3 side, if appropriate settings are previously set at the center apparatus 2 side, the processes to be performed by the terminal 3 can be determined.

The center apparatus 2 requests the information specified by the read-out URL to the server 1 (S2). The request is performed by the HTTP protocol, and since the request is the initial communication, the request does not include information for specifying a session, such as cookie, etc. When the server 1 receives this request which does not include information for specifying a session, from the center apparatus 2, the server 1 generates information for specifying a session, and in response to the request by the HTTP protocol, the server 1 delivers an XML document expressing the corresponding program and the generated session specifying information, to the center apparatus 2, i.e., the source of the request (S3). The center apparatus 2 stores the session specifying information received from the server 1, in association with the terminal identifier (_si) of the terminal 3, i.e., the request source. Further, center apparatus 2 converts the XML document received from the server 1 into a program which can be executed by the terminal 3. Then, the center apparatus 2 determines whether or not the data of this program should be encrypted. Similar to the example mentioned above, this determination is performed on the basis of the previously set settings as to whether or not the encryption is required.

When the center apparatus 2 determines that the data of the program should be encrypted, the center apparatus 2 encrypts the data and transmits the encrypted data to the terminal 3 (S4). When the center apparatus 2 determines that the data of the program should not be encrypted, the center apparatus 2 transmits the data of the program as it is to the terminal 3 in Step S4.

When the terminal 3 receives the data from the center apparatus 2, the terminal 3 increments the variable which expresses the request identification information. Then, if the received data is encrypted, the terminal 3 decrypts the data, extracts the program, stores the extracted program in the storage unit 32, and starts processes in accordance with the program (S5). If the received data is not encrypted, in Step 5, the terminal 3 stores the program included in the data in the storage unit 32, and starts processes in accordance with the program.

The program may be based on XML, as exemplified in FIG. 6. In case of the program exemplified in FIG. 6, in accordance with the sequential order of the input instructions, first, the control unit 31 performs the first input instruction relating to the operation guide element, i.e., the control unit 31 of the terminal 3 moves the cursor to the product ID input field to make the cursor be standby at the field. The cursor may be moved by the operation of the keypad. In this case, the order of the cursor movements may be defined by the order of screen elements included in the instruction.

When the user operates a barcode reader of the operation unit 33 to read the barcode of an in-stock item, the information read by the barcode reader is output to the control unit 31. The control unit 31 displays the information in the first input field display, and executes a branching process by comparing the input value and the value to be compared. Then, at this time, even if no value is input to the second input field, a predetermined value ("1" in the example of FIG. 6) is treated as being input in the second input field, and the branching process relating to the second input field is performed.

Here, with respect to the product ID, if the user reads a product ID other than "A", in accordance with the branching process shown in FIG. 6, an error can be displayed with respect the process at the terminal 3 side. Also, every time that the product ID "A" is read, the value in the second input field is incremented by "1".

When all branching processes are complete with respect to the respective values to be compared, the control unit 31 generates data including a list of input values (product ID and the number of pieces), a list of comparison results, and a data processing request. Here, the character string "_ri=2" as request identification information is added to the data processing request (as mentioned above, the variable relating to the request identification information has been incremented, and thus, the request identification information has become "2"). The control unit 31 determines whether or not the data should be encrypted, on the basis of the stored information. If the stored information indicates that the encryption is required, the control unit 31 encrypts the data, and transmits the encrypted data through the communication unit 35 to the center apparatus 2. If the stored information indicates that the encryption is not required, the control unit 31 transmits the data as it is through the communication unit 35 to the center apparatus 2 (S6).

If the data received from the terminal 3 is encrypted, the center apparatus 2 decrypts the received data. The center apparatus 2 receives the list of values and the input of determination result array included in the decrypted data (when the encryption is not performed, included in the received data as it is), and transmits the list of input values, etc., to the URL specified by the data processing request (corresponding to the URL of the data processing service at the server 1) to make the server 1 perform the corresponding process (S7). At this time, the center apparatus 2 reads out session specifying information associated with the terminal identifier (_si) of the terminal 3 which is the source of the data, and transmits the data, i.e., the list, etc., together with the read-out session specifying information to the server 1.

The server 1 refers to the session specifying information, and continues to perform the processes. Thanks to the operations of the center apparatus 2, even if the terminal 3 is restarted due to an error, etc., at the terminal 3, the information for specifying the session to the server 1 does not change, unlike the access from the terminal 3 using an ordinary browser application. Accordingly, information regarding a discontinued session (garbage) is not held in the server 1, resulting in preventing the increase of the burden to be applied to the server 1.

According to the present embodiment, the center apparatus 2, instead of the terminal 3, communicates with a web server, and executes various processes, and then, the center apparatus 2 transmits the results to the terminal 3 side to display thereon. At this time, the terminal 3 communicates with the center apparatus 2, and activates and executes an interpreter program for executing a program provided by the center apparatus 2.

Therefore, for example, even if a user of the terminal 3 happens to access a malicious site using an ordinary web browser (Internet Explorer, etc.) installed in the terminal 3, and a malware such as a software stealing the URL of an access destination is installed in the terminal 3, the URL communicating through the interpreter program or the program provided by the center apparatus 2 is not stolen. Even if the operating system executed by the terminal 3 is infected by a virus, the communication between the terminal 3 and the center apparatus 2 is performed by a unique protocol other than HTTP, and no program other than the interpreter program can perform communication with the center apparatus 2. Therefore, the virus cannot easily spread over the network.

[Modified Example]

The center apparatus 2 may store a list of terminal identifiers of some terminals 3 from among all the terminals in a storage device such as a hard disk drive, database, etc., and refuse to receive data transmitted from the terminal identifies on the list (refusal list). Upon receiving data from a terminal 3, the request reception unit 27 of the center apparatus 2 examines whether or not the terminal identifier of the relevant terminal 3 is included in the refusal list.

When the terminal identifier of the relevant terminal 3 is not included in the refusal list, the center apparatus 2 performs processes on the basis of the request included in the data (such as transmission of data to the server 1, and the like). When the terminal identifier of the relevant terminal 3 is included in the refusal list, the center apparatus 2 destroys the data and does not perform processes thereafter. Alternatively, the center apparatus 2 may transmit an instruction to temporarily disable the interpreter program. The center apparatus 2 may instruct the deletion of the interpreter program by executing a command to delete the interpreter program (overwriting the storage region where the interpreter program is stored with "0" data, and the like).

Thereby, even if there is a risk that the terminal 3 is tampered, such as the case that the terminal 3 is stolen, the improper use of the terminal 3 can be prevented.

The group identifier held by the terminal 3 and stored in the center apparatus 2 may be overwritable in accordance with an instruction transmitted from the server 1 side through the center apparatus 2. Specifically, in response to the instruction from the server 1, the center apparatus 2 instructs the terminal 3 to change the group identifier. Further, the group identifier may be changeable at the terminal 3 side. As mentioned above, the group identifier held by the terminal 3 can be overwritten from the server 1 side, and thereby, the URL for specifying information which should be delivered to the terminal 3, or a business application which should be executed at the terminal 3, can be switched without making the user of the terminal 3 be aware of the switching.

Further, according to the present embodiment explained above, unlike the conventional web application development, even if the development environment at the server 1 is made open, the communication between the server 1 and the terminal 3 is not made open, leading to the improvement of the security.

EXPLANATION ON NUMERALS 1 server, 2 center apparatus, 3 terminal, 21, 31 control unit, 22 communication management unit, 23 communication control unit, 24 communication unit, 25 HTTP client unit, 26 information conversion unit, 32 storage unit, 33 display unit, 34 operation unit, 35 communication unit

The invention claimed is:

1. A data processing system comprising a server which is configured to receive an access to a predetermined URL and to execute requested data processing, a terminal which is configured to request data processing to the server, and a center apparatus which is connectable to the server and the terminal, wherein the center apparatus comprises a device which is configured to receive data input, and to transmit a data input program for transmitting the input data to the center apparatus, to the terminal, a device which is configured to receive a request including both data to be processed and the URL of the server from the terminal to access the received URL, and to transmit the data to be processed to the server by an HTTP protocol, to request data processing to the server based on the received request, and the center apparatus is configured to receive session specifying information for identifying a session from the server when the center apparatus transmits the data to be processed to the server, and to store the session specifying information for identifying the session in association with a terminal identifier of the terminal which transmitted the data to be processed, the center apparatus is configured to receive a request identifier with the request from the terminal, to request data processing to the server based on the received request, to send the session specifying information for identifying the session to the server, where the session specifying information for identifying the session is stored in association with the terminal identifier for identifying the terminal which sent the request, the center apparatus is configured to receive a response to the request from the server, to send information based on the response to the terminal, together with the request identifier received from the terminal, and wherein the terminal is configured to operate in accordance with the data input program transmitted from the center apparatus, to receive the input of the data to be processed, to transmit the received data, the URL of the server and a request identifier to the center apparatus, and to receive a response from the center apparatus together with the request identifier which has been sent, and to compare the request identifier sent to the center apparatus with the request identifier received from the center apparatus to decide whether an error is occurred or not.

2. A center apparatus connectable to a server which is configured to receive an access to a predetermined URL and to execute requested data processing, and connectable to a terminal which is configured to request data processing to the server, the center apparatus comprising a device which is configured to receive data input, and to transmit a data input program for transmitting the input data to the center apparatus, to the terminal, and a device which is configured to receive a request including data to be processed and the URL of the server from the terminal, to access the received URL, and to transmit the data to be processed to the server by an HTTP protocol, and to request data processing to the server based on the received request, and the center apparatus being configured to receive session identifying information for identifying a session from the server when the center apparatus transmits the data to be processed to the server, and to store session identifying information for identifying a session from the server when the center apparatus transmits the data to be processed to the server, and to store the session specifying information for identifying the session in association with the terminal identified of the terminal which transmitted the data to be processed, where the session specifying information for identifying the session is stored in association with the terminal identifier identifying the terminal which sent the request, and an HTTP client unit, which is configured to transmit the stored session specifying information when accessing the URL, and transmits the data to be processed to the server by an HTTP protocol, wherein the center apparatus is configured to receive a response to the request from the server, and to send information based on the response to the terminal, together with the request identifier received from the terminal.

3. A non-transitory computer readable medium storing a program which causes a data processing system comprising a server which is configured to receive an access to a predetermined URL and to execute requested data processing, a terminal which is configured to request data processing to the server, and a center apparatus which is connectable to the server and the terminal, to execute:

a step of causing the terminal to receive data input, and to transmit a data input program for transmitting the input data to the center apparatus, a step of causing the center apparatus to receive a request including both data to be processed and the URL of the server from the terminal to access the received URL, and to transmit the data to be processed to the server by an HTTP protocol, to request data processing to the server based on the received request, and a step of causing the center apparatus to receive session specifying information for identifying a session from the server when the center apparatus transmits the data to be processed to the server, and to store the session specifying information for identifying the session in association with a terminal identifier of the terminal which transmitted the data to be processed, a step of causing the center apparatus to receive a request identifier with the request from the terminal, to request data processing to the server based on the received request, to send the session specifying information for identifying the session to the server, where the session specifying information for identifying the session is stored in association with the terminal identifier for identifying the terminal which sent the request, and a step of causing the center apparatus to receive a response to the request from the server, to send information based on the response to the terminal, together with the request identifier received from the terminal, and a step of causing the terminal to operate in accordance with the data input program transmitted from the center apparatus, to receive the input of the data to be processed, to transmit the received data, the URL of the server and a request identifier to the center apparatus, and to receive a response from the center apparatus together with the request identifier which has been sent, and to compare the request identifier sent to the center apparatus with the request identifier received from the center apparatus to decide whether an error is occurred or not.

* * * * *